April 11, 1939.  T. L. COWLES  2,153,862
STEERING MEANS
Filed April 23, 1938  2 Sheets-Sheet 2
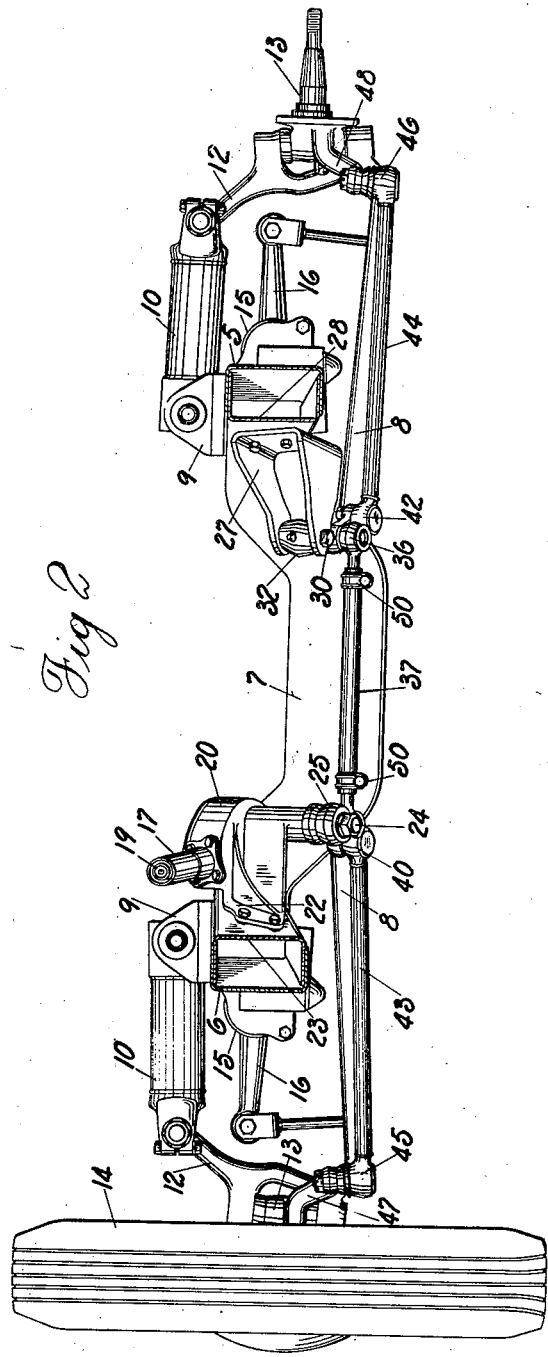
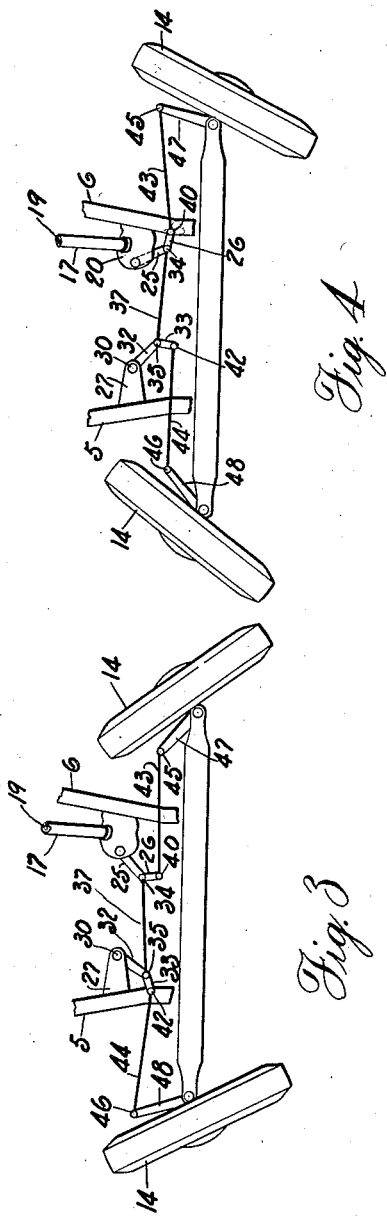
INVENTOR.
Thomas L. Cowles
BY Walter E. Shimer
ATTORNEY.

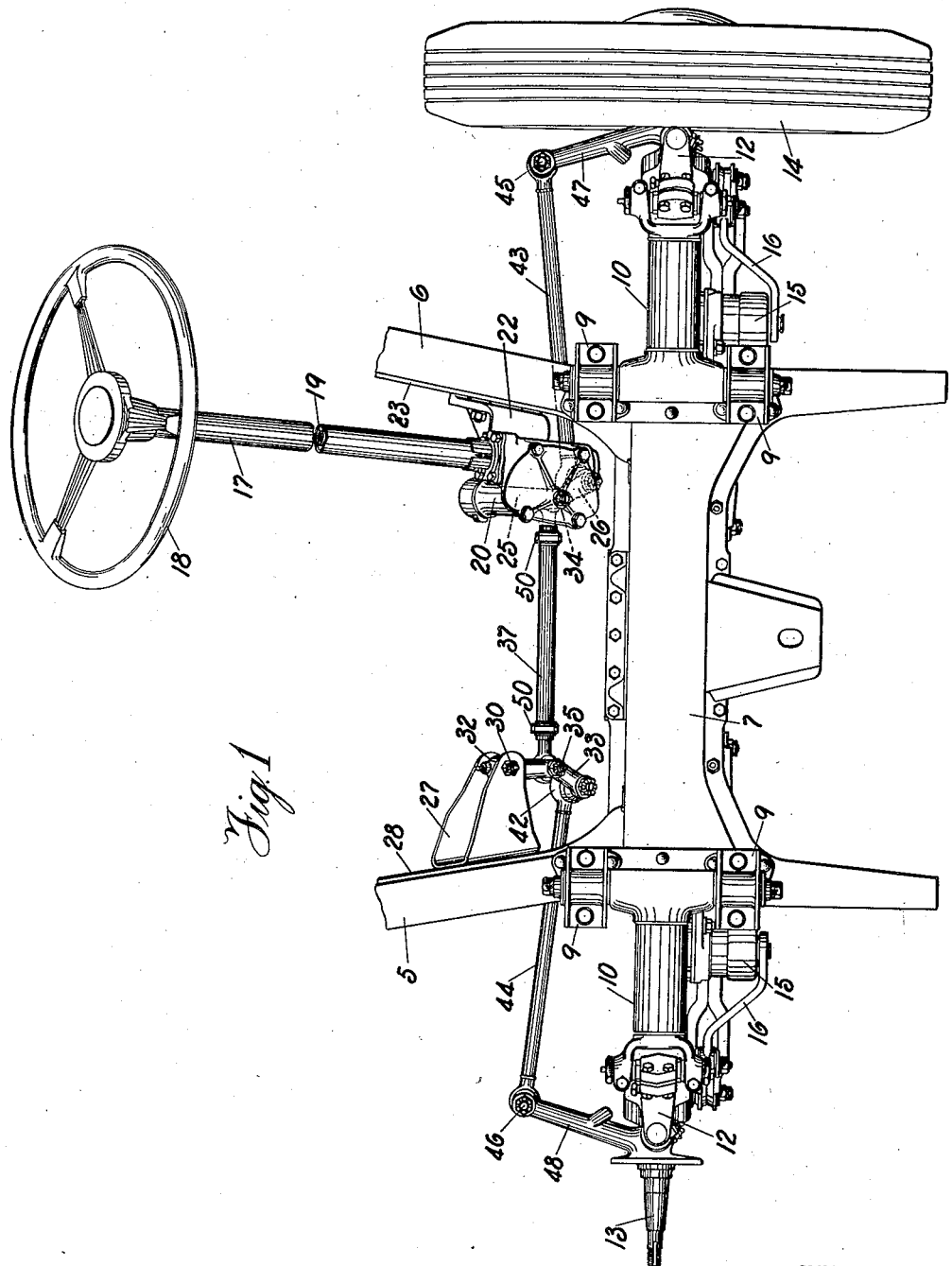

Patented Apr. 11, 1939

2,153,862

UNITED STATES PATENT OFFICE 2,153,862

STEERING MEANS

Thomas L. Cowles, South Bend, Ind., assignor to The Studebaker Corporation, South Bend, Ind., a corporation of Delaware Application April 23, 1938, Serial No. 203,737

2 Claims. (Cl. 280—95)

This invention relates to steering means, and more particularly to a steering gear assembly for automotive vehicles and the like.

With the advent of independently sprung steering wheels certain problems have arisen in connection with the leverage systems by which the steering action is transmitted from the steering wheel to the wheel spindles. The present invention contemplates an assembly that possesses certain distinct advantages of cost, simplicity of design, assembly and adjustment, and ease of operation.

One object of the present invention is to connect the shaft from the steering gear housing directly to the tie rod assembly which at its ends is connected to the wheel steering knuckles. The tie rod assembly is supported only from this shaft and from the opposite side rail, and is independent of any connection to the front axle.

Another object of the present invention is to provide a jointed tie rod assembly interconnecting the dirigible wheels, in which the central or intermediate section is mounted for horizontal swinging movement by a link pivotally supported on one side rail and by the steering arm adjacent the other side rail. This eliminates the complications of the sliding block support which has been used heretofore and also is of considerably simpler and more economical construction than the parallel link system by which the tie rod is supported on the front axle or cross frame member to which the center of the axle is secured.

One of the main advantages derived from the present arrangement is that road shocks or jouncing of either front wheel of the vehicle will not impose any shocks or stresses on the steering wheel, and wheel "shimmy" is entirely eliminated. Also, by the use of ball and socket joints in the tie rod assembly and its support the wear on bushings, steering column gears and the like is materially reduced.

Another advantage of the present invention is the elimination of the drag link connection between the steering gear housing and the tie rod, inasmuch as the present construction provides for direct universal connection of the steering gear shaft to the tie rod.

Still another advantage in conjunction with the elimination of the drag link is the elimination of the bell crank by which motion was transmitted from the drag link to the tie rod. This allows adjustment to be made by merely varying the length of the intermediate section of the tie rod, without in any way affecting the desired geometrical relationship between the steering knuckles.

Another feature of the present invention is its adaptability for use in a planar independent wheel suspension, whereby the entire steering mechanism is independent of support on the axle assembly, and is located in position solely by a pair of brackets on the side rails of the chassis, one of which brackets supports the steering gear housing and actuating shaft to which the tie rod assembly is connected for movement.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 1 is a top plan view of the front end of a vehicle provided with the present invention;

Figure 2 is a side elevational view looking toward the front of the vehicle;

Figure 3 is a diagrammatic view illustrating the steering action in one direction; and Figure 4 is a similar diagrammatic view illustrating the steering action in the opposite direction.

Referring now in detail to the drawings, I have indicated the two side rails of the vehicle frame or the like at 5 and 6. These side rails preferably are channel-shaped and extend forwardly upon the cross member 7 which is disposed transversely therebetween and which forms a suitable support for the transversely extending leaf spring member indicated at 8 in Figure 2. Mounted on top of the side rail members 5 and 6 in line with the cross member 7 are suitable bearing brackets 9 which form channel supports for a normally projecting T-shaped member 10 which at its outer end is pivotally connected to the front end of the wheel spindle supports 12. Pivotally mounted in these supports 12 are the wheel spindles 13 upon which are rotatably mounted wheels such as indicated at 14.

The lower ends of the supports 12 are pivotally connected to the extending ends of the leaf spring arms 8 thereby providing planar suspension for the wheels so that they may independently oscillate about the brackets 9 in accordance with irregularities in the road surface. Preferably suitable shock absorbers 15 are mounted on the frame and have the arms thereof indicated at 16 connected to the outer ends of the axles for cushioning road shocks.

Considering now in detail the steering mechanism, there is provided the conventional steering column 17 at the upper end of which is rotatably mounted a steering wheel 18 and within which extends the steering post 19 projecting into the steering gear housing 20. This housing 20 is supported by means of an integral bracket portion 22 upon the inner surface of a channel member 23 which telescopes into the side rail 6 as indicated clearly in Figure 2, to provide a box section frame adjacent the cross member 7.

Within the housing 20 the steering post 19 is provided with a worm gear which engages a suitable crank for effecting rotation of the shaft 24 which projects downwardly and angularly from the housing 20. The shaft 24 is adapted to receive a suitably inclined arm 25 connected to the end thereof which arm 25 is provided with an angularly offset portion 26 shown in dotted lines in Figure 1.

A suitable channel-shaped bracket 27 is mounted on the inner face of the channel-shaped frame member 28, which telescopes into the side rail 5 adjacent the cross member 7, and the bracket is inclined angularly as clearly shown in Figure 2. The bracket 27 provides a support for the pin 30 upon which is mounted an arm 32 corresponding to the arm 25 but which is reversed in position so that the offset portion 33 thereof extends in a direction opposite to that of the offset portion 26 of the arm 25. Each of the arms 25 and 32 is provided with stud members 34 and 35, respectively, terminating in ball portions which are adapted to receive the socket ends 36 of an intermediate tie rod section 37. This provides a universal support for the tie rod 37 between the arms 25 and 32 whereby the tie rod section 37 is supported for substantially horizontal swinging movement between the side rails 5 and 6 by means of these arms.

In the ends of the offset portions 26 and 33 of the arms a second ball and socket connection is provided as indicated at 40 and 42, respectively, to which are connected the end tie rod sections 43 and 44, respectively. The outer extremities of the tie rod sections 43 and 44 have universal connection as indicated at 45 and 46, respectively, with the steering knuckles 47 and 48 formed on the spindles 13.

In the operation of this steering mechanism rotation of the steering wheel 18 results in corresponding rotation of the steering post 19 which through the reduction worm gearing effects rotation of the shaft 24 projecting from the steering gear housing. Consequently the arm 25 swings with this shaft in a generally angularly inclined plane to produce a corresponding swinging movement of the tie rod assembly comprising the sections 37, 43 and 44, and also effects swinging movement of arm 32.

In Figure 3 the steering wheel has been turned in a clockwise direction as viewed in Figure 1 resulting in the steering wheel 14 being turned to the right as shown in Figure 3. Due to the offset of the arms 25 and 32, it will be noted that the wheel 14 at the right hand side of the vehicle is turned through a greater angle than the offset wheel. This results in the proper geometric relationship between the steering wheels due to the fact that they turn about different steering radii.

Reverse movement of the steering wheel 18 results in opposite movement of the rigidly mounted wheels 14 and turns the vehicle in the opposite direction, the geometric relationship of the angle through which the wheels turn being maintained due to the difference in angular position of the offset portions 26 and 33 of the arms and the arc through which these portions move.

The member 37 which forms an intermediate section of the tie rod assembly is preferably provided with end portions telescoping into the central portion and held in position by suitable clamps such as indicated at 50. By reason of this construction the overall length of the section 37 may be varied and consequently provide for adjustment of the steering wheels and of the steering mechanism and such adjustment will be simultaneously effective upon both portions of the steering assembly so as to maintain uniformity of the relative position of the wheels 14. It will be apparent that the tie rod assembly consisting of the end sections 43 and 44 and of the intermediate section 37 are connected together through the relatively short offset portions 26 and 33 of the arms 25 and 32. As a result, the angular position of these offset portions during swinging movement provides for the relative difference in turning effect imparted to the sections 43 and 44. This is clearly illustrated in Figures 3 and 4.

It will be apparent that the tie rod constitutes a jointed assembly which is supported entirely on the steering gear housing and the bracket 32 independently of any support on the axle structure. Further, it will be noted that the angular inclination of the steering gear housing and the bracket 32 dispose the arms 32 and 25 below any portion of the engine and in such manner that the entire steering mechanism is disposed in an angularly inclined plane with respect to the steering knuckles. This angularity, coupled with the universal joint connections of each of the tie rod sections, provide for positive steering control with the independently sprung wheels and facilitates operation of the steering mechanism regardless of the relative positions of the wheels which may be caused by irregularities of road surface.

The mechanism is of extremely simple construction, requiring relatively few parts and may be readily assembled and adjusted. No support for the intermediate section 37 is provided except on the two swinging arms 25 and 32, one of which constitutes the actuating arm controlled directly upon the steering gear housing.

It is therefore believed apparent that I have provided a relatively simple and economical steering means which has distinct advantages in so far as support and flexibility are concerned and which substantially eliminates any tendency for shimmy and excessive wear on steering gear bushings or the like.

I am aware that various changes may be made in certain details of the construction herein shown and described and I therefore do not intend to be limited except as defined by the scope and spirit of the appended claims.

I claim:

1. In a vehicle, a pair of spaced side frame members, steering mechanism including an intermediate tie rod section and end tie rod sections, an arm having an angularly offset portion, pivotal connections from adjacent ends of one of said end sections and the intermediate section to the beginning and the end of said offset portion of said arm, a U-shaped bracket having its base secured in inclined position on one of said side frame members and extending toward the other side frame member, a pivot pin extending between the flanges of said bracket, and means at one end of said arm journalling the same on said pin between said flanges.

2. Supporting means for a jointed sectional tie rod of a vehicle steering mechanism, including a rigidly supported U-shaped bracket, an arm having one end thereof journalled for pivotal movement between the arms of said bracket, an angularly offset end portion on said arm, studs carried at the beginning and the end of said offset portion, and means for pivotally mounting adjacent ends of the tie rod sections on said studs.

THOMAS L. COWLES.